United States Patent [19]

Wiewiorowski et al.

[11] 3,903,245

[45] Sept. 2, 1975

[54] ENHANCED COBALT RECOVERY IN THE DISTILLATION OF AMMONIACAL CARBONATE SOLUTIONS OF NICKEL AND COBALT

[75] Inventors: Tadeusz Karol Wiewiorowski, New Orleans; David James Miller, Gretna, both of La.

[73] Assignee: Freeport Minerals Company, New York, N.Y.

[22] Filed: July 9, 1973

[21] Appl. No.: 377,598

[52] U.S. Cl. ............................... 423/143; 423/144
[51] Int. Cl.² .................. C01G 51/06; C01G 53/06
[58] Field of Search ........... 423/140, 145, 143, 144; 75/103, 108, 119

[56] References Cited
UNITED STATES PATENTS

| | | |
|---|---|---|
| 2,867,503 | 1/1959 | Roy ....................................... 75/108 |
| 2,913,334 | 11/1959 | Dean .................................... 423/141 |
| 2,915,389 | 12/1959 | Dean .................................... 75/108 |
| 3,107,996 | 10/1963 | Goldstein ............................. 75/103 |
| 3,141,765 | 7/1964 | Brown et al. ......................... 75/103 |
| 3,342,547 | 9/1967 | Illis et al. ............................. 423/144 |
| 3,671,250 | 9/1973 | Weir et al. ............................ 75/103 |

Primary Examiner—Oscar R. Vertiz
Assistant Examiner—Brian E. Hearn
Attorney, Agent, or Firm—Lawrence W. Flynn

[57] ABSTRACT

In the straight distillation of aqueous ammoniacal carbonate solutions containing nickel and cobalt for the non-selective recovery of these metals as a mixed precipitate consisting mainly of basic nickel and cobalt carbonates, cobalt recoveries are significantly improved by carrying out the distillation in the presence of small amounts of sulfide ions.

13 Claims, No Drawings

ENHANCED COBALT RECOVERY IN THE DISTILLATION OF AMMONIACAL CARBONATE SOLUTIONS OF NICKEL AND COBALT

BACKGROUND OF THE INVENTION

This invention relates to an improved method for recovering nickel and cobalt from aqueous ammoniacal carbonate solutions containing these metals. In particular, it relates to an improved method for recovering nickel and cobalt from ammoniacal carbonate solutions by "straight distillation" in which substantially all of the cobalt in solution is recovered along with the nickel.

In commerical mineral processing, aqueous ammoniacal carbonate solutions containing dissolved cobalt and nickel are prepared by heating cobalt-containing nickeliferous ores in a furnace with a reductant and then leaching the reduced ores, in the presence of oxygen, with an aqueous solution of ammonium hydroxide and ammonium carbonate. Examples of the production of such solutions are described in U.S. Pat. Nos. 1,487,145 and 3,100,700, and in "The Winning of Nickel", J. R. Boldt, Jr., Van Nostrand Co., Inc., Princeton, N.J., 1967, pp. 425–437.

Since the object of the processing is to recover the nickel and cobalt values present in the original ore, methods have been developed to separate and recover the metals from the ammoniacal leach solutions in a convenient form. One such technique involves the "straight distillation" of the solutions, either with or without a prior step such as a sulfiding or solvent extraction treatment to selectively remove some of the cobalt. A prior treatment step is sometimes desirable where the ores have a high cobalt content.

The term "straight distillation", as used herein, is in contrast to a "partial distillation" or a "selective distillation", and instead refers to an operation in which the pregnant ammoniacal solution is heated to drive off vapors of ammonia and carbon dioxide and non-selectively precipitate as much dissolved nickel and cobalt as possible as a mixture of basic carbonates. In partial or selective distillation, on the other hand, the objective is to selectively precipitate only the cobalt, leaving most of the nickel in solution, so as to achieve a separation of the nickel and cobalt. Partial or selective distillation is based on the phenomenon that the cobalt tends to precipitate in advance of the nickel so that if the distillation is halted at the right point, a cobalt-enriched precipitate is obtainable with most of the nickel still in solution. U.S. Pat. Nos. 2,735,760, 2,913,336 and 2,915,389 describe the partial or selective distillation of ammoniacal solutions of nickel and cobalt. The objective of these patents is to precipitate in advance of the nickel as much of the cobalt as possible. This is accomplished by adding to the ammoniacal solution materials such as Raney nickel, powdered cobalt, nickel or iron, ferrous sulfate, ferrous ammonium sulfate, and sulfurous or partially oxidized sulfur compounds. The theory is that these additives reduce the cobalt from the cobaltic to the cobaltous state in which the cobalt becomes less soluble. Accordingly, sufficiently large amounts of the additive are used to carry out the cobalt reduction, illustratively anywhere from 1 to 23 moles of additive per mole of dissolved cobalt. As will appear below, the present invention also contemplates additives to the solution but of a different type, in smaller amounts, and for a different purpose, i.e. improved straight distillation as opposed to improved partial or selective distillation.

Straight distillation produces a precipitate which is normally a mixture of basic nickel carbonate $xNi(OH)_2 \cdot NiCO_3$ and basic cobalt carbonate $xCo(OH)_2 \cdot CoCO_3$ wherein $x$ can vary from 1 to 4. The basic carbonates may be marketed as such, or may be further calcined and sintered to produce a more refined metallic product. Straight distillation is relatively inexpensive and has the advantage that the expelled ammonia and carbon dioxide may be conveniently recovered in scrubbing water and reused in making fresh leach liquor for the process.

A common disadvantage of straight distillation, however, is that, while nickel recoveries are usually excellent, cobalt recoveries are often poor, that is, although the precipitation of nickel is nearly quantitative and often as high as 99%, the precipitation of cobalt is not nearly as complete and often is as low as 50–70%. This not only represents a loss of valuable cobalt, but may create a pollution problem since the cobalt values that remain in solution normally end up in the plant effluent streams, and disposing of them increases the cost of the plant effluent treatment operations. Therefore, a method for increasing the fraction of the cobalt which may be recovered together with the nickel upon straight distillation of pregnant ammoniacal solutions would be most desirable. Similarly, a method for depleting the ammoniacal solutions of cobalt values which otherwise would not only be lost, but also contaminate the process effluent streams would also be most desirable. It is an object of this invention to provide such a method. Other objects will become apparent to those skilled in the art from a consideration of this entire disclosure.

SUMMARY OF THE INVENTION

It has been found that virtually all the soluble cobalt present in an aqueous ammoniacal solution can be recovered by straight distillation, without adversely affecting nickel recoveries, if the solution contains small amounts of sulfide ions at some point during the distillation. By "small amounts" is meant a quantity sufficiently small to avoid causing substantial precipitation of the nickel and cobalt as nickel or cobalt sulfides. As is known, the treatment of pregnant ammoniacal leach solutions with large amounts of a sulfiding agent is a method used to precipitate nickel and cobalt sulfide. However, an objective in the present invention is not to form sulfides, but rather to advantageously use small amounts of sulfide ions as a means for inducing the precipitation as a basic carbonate of the residual 30 to 50% of the cobalt in solution which normally does not precipitate during straight distillation.

As used herein, precipitation of nickel sulfide or cobalt sulfide is considered substantial if more than about 10% of the nickel or cobalt in solution precipitates as its sulfide forms. Were the basic carbonate precipitate to contain more than about 10% nickel sulfide or cobalt sulfide, it could interfere with many of the conventional subsequent processing steps to which the basic carbonate precipitate is normally subjected. When the preferred conditions are used, less than about 2% of the nickel or cobalt will precipitate as the sulfide form. The invention contemplates the use of far lower sulfide ion levels than are used in the conventional sulfiding processes wherein the sulfide ions directly react with the nickel or cobalt ions in solution to form insoluble nickel sulfide or cobalt sulfide.

The presence of the sulfide ions during distillation causes virtually all the cobalt in solution to precipitate and has resulted in the production of basic carbonate precipitates containing up to 40% more cobalt than those produced by conventional straight distillation methods. By the use of the present invention, as much as about 99% of the nickel and cobalt in solution is capable of recovery in a straight distillation operation.

The sulfide ions can originate from many sources. They can be generated in situ in the solution by the addition of one or more compounds, or they can be formed by adding to the solution one or more compounds which, upon solubilizing, will provide sulfide ions in the solution. Useful sources of sulfide ions include such soluble sulfide additives as hydrogen sulfide $H_2S$, ammonium sulfide $(NH_4)_2S$, ammonium hydrosulfide $NH_4HS$ or nickel hydroxy hydrosulfide $NiHSOH$, it being understood that these compounds are illustrative only and that any compound or compounds capable of providing sulfide ions in the pregnant ammoniacal solution are contemplated within the scope of the invention.

The compounds can be added to the solution any time prior to completion of the distillation since it is only necessary that the sulfide ions be present sometime during the distillation. Thus the compounds can be added before or during the distillation, although addition before distillation is preferable.

The invention is more fully described in the ensuing discussion of its preferred embodiments.

DESCRIPTION OF THE PREFERRED EMBODIMENTS

The invention is applied in a conventional straight distillation step. There are several ways in which the distillation can be carried out. For example, the solution may be distilled by boiling it in a heated vessel, separating the vapors formed, and collecting the precipitated carbonate product. Hot boiling water may be added to maintain the solution volume fairly constant, and a vacuum may be applied to lower the temperature requirements of the operation. Another way of carrying out the straight distillation is by feeding the solution to a conventional distillation tower and stripping it of its ammonia and carbon dioxide with live steam flowing countercurrent to the solution. The steam condenses while providing the heat required for the decomposition of the solution constituents and the concomitant vaporization of ammonia and carbon dioxide, thereby causing the precipitation of the metals as basic carbonates. A variation of this technique involves the use of a preheater and a series of agitated vessels, or precipitation kettles. The pregnant solution is fed to the preheater to raise its temperature to just below its boiling point, and then passes to the top of a stripping tower where it loses most of its ammonia and a portion of its carbon dioxide. Hot vapors from the precipitation kettles enter the bottom of the tower and are used to vaporize the ammonia and carbon dioxide from the solution. From the tower, the solution passes through the series of precipitation kettles, where it loses more of its ammonia and a major portion of its carbon dioxide, while at the same time precipitating the nickel and cobalt values as basic carbonates. Steam enters the last kettle and flows countercurrent to the solution. The vapors leaving the top of the tower are normally sent to a water scrubbing operation to recover the ammonia and carbon dioxide in order to reuse them in making the leach liquor for the process.

Process requirements normally dictate which of the various straight distillation techniques should be used in any particular process. In any case, design features of the distillation operation, such as the type and configuration of the equipment used, control of carbon dioxide-to-ammonia ratio in the solution, stripping temperatures and pressures, steam pressure, number of stages, etc., are known to those skilled in the art and need not be repeated herein.

The invention can be applied to the distillation of ammoniacal carbonate solutions illustratively having a total ammonia content of about 70 grams per liter, expressed as $NH_3$, and a free ammonia ($NH_4OH$) content of about 20 grams per liter, expressed as $NH_3$. The pH of these solutions is normally above 7, and preferably above 8. Their nickel content is normally between about 4 and 20 grams per liter, preferably about 10 grams per liter, and their cobalt content is normally between about 0.05 and 2 grams per liter, and preferably about 0.5 grams per liter.

The additive which is to provide the sulfide ions can be added directly to the ammoniacal solution, or it may be diluted in an ammoniacal solution and this diluted mixture injected into the solution. It is preferably added in the direct manner. The additive can be incorporated in the solution prior to the distillation operation, or during distillation, e.g., by injecting it at a certain point in a distillation tower. It is preferably added prior to the distillation operation and then with agitation of the mixture and less than two hours before distillation begins.

As to the amount of the additive, the upper limit is that quantity which will provide a sufficiently high sulfide ion concentration to cause more than about 10% of the nickel or cobalt to precipitate in its sulfide form. The lower limit is an amount effective to improve the amount of cobalt which precipitates as the carbonate. Thus enough additive should be used to cause the desired precipitation of the additional cobalt during the straight distillation but not enough to cause more than about 10% of the cobalt in solution to precipitate as cobalt sulfide. Since cobalt sulfide tends to precipitate in advance of nickel sulfide, most of any sulfide which does precipitate will be cobalt sulfide. Generally only small amounts, e.g. 1% or less, of the nickel in solution will precipitate as nickel sulfide in the practice of the invention. The resulting precipitate therefore is predominantly a mixture of basic nickel and cobalt carbonates, with the mixed carbonates ordinarily forming about 90% or more of the precipitate on a dry basis.

By way of illustration, it has been found that cobalt recovery is improved if the solution contains from about 0.1 to 0.8, and preferably about 0.3 to 0.6, moles of sulfide ion ($S^=$) per mole of cobalt dissolved in the solution. The moles of additive required to produce such sulfide ion levels can, in most cases, be readily calculated by those skilled in the art. For many of the more soluble sulfide additives which contain but one mole of sulfide ion, the illustrative and preferred amounts of additive will also be about 0.1 to 0.8 and 0.3 to 0.6, respectively, moles of additive per mole of cobalt dissolved in solution. More nickel and cobalt precipitates as the sulfide form at the higher levels of sulfide ion concentration and less at the lower levels. For example, when 0.8 moles of sulfide ion per mole of dissolved cobalt are used, as much as 10% of the cobalt may precipitate as cobalt sulfide with the remainder precipitating as basic cobalt carbonate. When the preferred sulfide concentrations are used, ordinarily less than about 2% of the cobalt will precipitate as cobalt sulfide, thus forming a precipitate highly enriched in the basic carbonates. The amount of sulfide formed can, of course, vary somewhat even for a fixed sulfide ion concentration, depending on factors such as the nickel and cobalt concentrations in solution and other variables.

Preferred sources of sulfide ions are the inexpensive, readily available soluble sulfides, with ammonium sulfide $(NH_4)_2S$ being one preferred species of additive. These compounds can be added to the pregnant ammoniacal solution where they readily dissolve to provide sulfide ions in solution.

After the solution is provided with the requisite sulfide ions, it is subjected to straight distillation in order to precipitate substantially all of its nickel and cobalt content as basic carbonates. The preferred method of straight distillation is carried out in a conventional bubble cap distillation tower where steam is fed at the bottom and flows upward, countercurrent to the pregnant ammoniacal solution which is fed at the top. A preheater is used to preheat the solution before being fed to the tower to a temperature below its boiling point. The tower overhead vapors containing the expelled ammonia and carbon dioxide are sent to a reagent recovery system where the ammonia and carbon dioxide are scrubbed with water and used again in making fresh leach liquor for the process. The bottoms slurry, containing the nickel and cobalt values as a mixture of basic nickel carbonate and basic cobalt carbonate, is then filtered and dried. The dry basic carbonates thereby obtained may constitute the final product of the process, or may be further treated to produce a more refined product in accordance with known procedures.

The following example is provided to further illustrate the invention:

EXAMPLE

A pregnant ammoniacal carbonate solution produced by conventional ammoniacal leaching of reduced nickeliferous ores was used in all tests of this example. The solution had a total ammonia content, expressed as $NH_3$, of 70 grams per liter, a free ammonia content, expressed as $NH_3$, of 20 grams per liter, a nickel content of 10.1 grams per liter, and a cobalt content of 0.255 grams (.00434 moles) per liter.

Test 1 was a control test in which sulfide ions were not added to the solution. One liter of the solution was subjected to straight distillation by boiling at atmospheric pressure while adding water to maintain a constant volume. Upon completion of the straight distillation, the slurry formed was filtered and the filtrate analyzed. The filtrate contained 0.05 grams per liter of nickel and 0.067 grams per liter of cobalt, indicating a completeness of nickel precipitation of 99%, and a completeness of cobalt precipitation of about 70%. Thus a substantial amount of cobalt remained in solution at the end of the distillation.

In Test 2, one liter of the same pregnant solution from Test 1 was treated with 0.17 grams (.0025 moles) of ammonium sulfide $(NH_4)_2S$. This corresponds to about 0.578 moles of ammonium sulfide per mole of dissolved cobalt in solution. Upon addition of the ammonium sulfide, there was no perceptible precipitation observed in the solution. Immediately after addition of the ammonium sulfide, the solution was subjected to straight distillation in the same manner and under the same conditions as in Test 1, and the slurry formed was filtered and analyzed. The precipitate was a mixture of basic nickel and cobalt carbonates and was substantially free of nickel sulfide or cobalt sulfide despite the addition of the ammonium sulfide to the solution. The filtrate contained 0.05 grams per liter of nickel and 0.003 grams per liter of cobalt, indicating a completeness of nickel precipitation of 99% and a completeness of cobalt precipitation of nearly 99%.

It is evident from the above results that the precipitation of cobalt from the ammoniacal solution was significantly improved by the treatment of our invention. At the same time, the precipitation of the nickel values was not adversely affected.

The specific and detailed information presented above is by way of illustration only and such alterations and modifications thereof as would be apparent to one skilled in the art are deemed to fall within the scope and spirit of the invention, the invention being limited only by the following claims.

What is claimed is:

1. In a method for recovering nickel and cobalt from an aqueous ammoniacal carbonate solution containing dissolved nickel and cobalt which comprises subjecting the solution to straight distillation in order to drive off vapors of ammonia and carbon dioxide and non-selectively recover the nickel and cobalt as a mixed precipitate of basic nickel and cobalt carbonates, the improvement comprising adding to the solution from about 0.1 to 0.8 moles per mole of cobalt in solution of a compound capable of providing sulfide ions in the solution, and carrying out the distillation in the presence of said sulfide ions.

2. The method of claim 1 wherein about 0.3 to 0.6 moles of compound per mole of cobalt in solution are added.

3. The method of claim 1 wherein the compound is a sulfide selected from the group consisting of hydrogen sulfide, ammonium sulfide, ammonium hydrosulfide and nickel hydroxy hydrosulfide.

4. The method of claim 1 wherein the compound is added before the distillation is begun.

5. The method of claim 1 wherein about 0.3 to 0.6 moles of ammonium sulfide per mole of cobalt in solution are added to the solution less than two hours before the distillation is begun.

6. In a method for recovering nickel and cobalt from an aqueous ammoniacal carbonate solution containing dissolved nickel and cobalt which comprises subjecting the solution to straight distillation in order to drive off vapors of ammonia and carbon dioxide and non-selectively recover the nickel and cobalt as a mixed precipitate of basic nickel and cobalt carbonates, the improvement comprising adding to the solution, from a source external to the solution, a compound capable of providing sulfide ions in the solution, said compound added in a sufficiently small amount to cause less than about 10% of the cobalt, and less than about 1% of the nickel in solution to precipitate in their sulfide forms as a result of the addition of the compound to the solution, and carrying out the distillation in the presence of said sulfide ions.

7. The method of claim 6 wherein the solution contains during the distillation about 0.1 to 0.8 moles of sulfide ion per mole of cobalt in solution.

8. The method of claim 6 wherein the solution contains during the distillation about 0.3 to 0.6 moles of sulfide ion per mole of cobalt in solution.

9. The method of claim 6 wherein the amount of compound added is sufficiently low to cause less than about 2% of the cobalt in solution to precipitate in its sulfide form.

10. In a method for recovering nickel and cobalt from an aqueous ammoniacal carbonate solution containing dissolved nickel and cobalt which comprises subjecting the solution to straight distillation in order to drive off vapors of ammonia and carbon dioxide and non-selectively recover substantially all of the nickel and most of the cobalt as a mixed precipitate of basic nickel and cobalt carbonates, the improvement comprising adding to the solution from an external source, a sufficient amount of a compound capable of providing sulfide ions in the solution to produce about 0.1 to 0.8 moles of sulfide ions per mole of cobalt in solution, and carrying out the distillation in the presence of said sulfide ions, whereby substantially all the cobalt in solution is recoverable with the nickel as a basic carbonate.

11. The method of claim 10 wherein a sufficient amount of said compound is added to provide about 0.3 to 0.6 moles of sulfide ions per mole of cobalt in solution.

12. In a method for recovering nickel and cobalt from an aqueous ammoniacal carbonate solution containing dissolved nickel and cobalt which comprises subjecting the solution to straight distillation in order to drive off vapors of ammonia and carbon dioxide and non-selectively recover the nickel and cobalt as a mixed precipitate of basic nickel and cobalt carbonates, the improvement comprising carrying out the distillation in the presence of a sufficiently small amount of sulfide ions to cause less than about 10% of the cobalt, and less than about 1% of the nickel, in solution to precipitate in their sulfide forms, at least a portion of said sulfide ions originating from the addition to the solution from an external source of a compound capable of forming sulfide ions in the solution.

13. The method of claim 12 wherein the distillation is carried out in the presence of about 0.1 to 0.8 moles of sulfide ion per mole of cobalt in solution.

* * * * *

UNITED STATES PATENT OFFICE
CERTIFICATE OF CORRECTION

PATENT NO. : 3,903,245
DATED : September 2, 1975
INVENTOR(S) : Tadeusz K. Wiewiorowski et al.

It is certified that error appears in the above-identified patent and that said Letters Patent are hereby corrected as shown below:

On the cover page of the patent, second column, the references cited in the Office Action of August 16, 1974 should be inserted. These references are as follows:

-- 811,078  4/69  Canada  Zubryckyj ...  75/119 -- and

-- Masterton et al., "Chemical Principles",

W. B. Saunders Co., Phila, Pa., 2nd Ed., 1969, pp. 542-544 -- .

At col. 4, line 47, "nikel" should be -- nickel -- .

Signed and Sealed this sixth Day of January 1976

[SEAL]

Attest:

RUTH C. MASON
Attesting Officer

C. MARSHALL DANN
Commissioner of Patents and Trademarks